United States Patent [19]
Horikoshi

[11] Patent Number: 5,646,472
[45] Date of Patent: Jul. 8, 1997

[54] METAL HALIDE LAMP

[75] Inventor: Souichirou Horikoshi, Gyouda, Japan

[73] Assignee: Iwasaki Electric Co., Ltd., Tokyo, Japan

[21] Appl. No.: 439,940

[22] Filed: May 12, 1995

[30] Foreign Application Priority Data

May 12, 1994 [JP] Japan .................................. 6-122037
May 24, 1994 [JP] Japan .................................. 6-132408

[51] Int. Cl.$^6$ ........................... H01J 61/40; H01J 61/82
[52] U.S. Cl. ................................................... 313/112; 313/635
[58] Field of Search ............................ 313/112, 110, 313/113, 637, 638, 639, 642, 635

[56] References Cited

FOREIGN PATENT DOCUMENTS

| | | |
|---|---|---|
| 0400980 | 12/1990 | European Pat. Off. . |
| 0418784 | 3/1991 | European Pat. Off. . |
| 4318905 | 12/1994 | Germany . |
| 36-250958 | 11/1961 | Japan . |
| 62131462 | 6/1987 | Japan .................................. 313/112 |
| 2035679 | 6/1980 | United Kingdom .................. 313/112 |

*Primary Examiner*—Nimeshkumar Patel
*Attorney, Agent, or Firm*—Sixbey, Friedman, Leedom & Ferguson; Gerald J. Ferguson, Jr.; Karlton C. Butts

[57] ABSTRACT

The color temperature of irradiation light from a metal halide lamp comprising an arc tube filled with metal halide, mercury and inert gas, electrodes at the opposite ends of the arc tube and a glass housing of housing said arc tube is lowered to 2000–6000 K by a selective transmission coating. The selective transmission coating which transmits irradiation light of longer wavelengths generated between said electrodes and reflects the irradiation light of shorter wavelengths is applied to the outer surface of said arc tube. The selective transmission coating transmits the irradiation light of wavelengths longer than nearly 600 nm and reflects the irradiation light of wavelengths shorter than nearly 600 nm. This coating is particularly effective for a metal halide lamp filled with metal halide which comprises dysprosium, neodymium and iode of cesium and the color temperature of the irradiation light inside the arc tube is 6000–7500 K.

11 Claims, 12 Drawing Sheets

METAL HALIDE LAMP

BACKGROUND OF THE INVENTION

1. Field of the Invention

The present invention relates to a metal halide lamp having improved characteristics of color temperature of lamp light.

2. Related Background Art

Metal halide lamps are used nowadays often in its specific applications. For example, if light source color of the setting sun, light source color of the rising sun, cool white of the sun, and daylight of the blue sky are intended to be radiated for performance, lamps having color temperatures of 2000 to 3000 K, 3000 to 4000 K, 4000 to 5000 K, and 6000 to 7000 K respectively are used.

A metal halide lamp having an arc tube filled in which is a combination of metal iodides such as dysprosium (Dy) iodide and thallium (Tl) iodide or a combination of metal iodides such as dysprosium (Dy) iodide and neodymium (Nd) iodide, is characterized in its high luminous efficacy and high color rendering property. Application fields such as indoor illumination by such metal halide lamps are expanding and demands for such lamps are increasing.

A color temperature of a metal halide lamp is determined by a kind of a fill in the arc tube. Therefore, each metal halide lamp having its specific color temperature is not suitable for the performance of a light source color of a different color temperature.

A technique is known which converts a color temperature of a light source by forming an optical interference coating on the surface of a light transmissive substrate enclosing the light source. With this technique, a lamp having a desired color temperature can be manufactured by using an optical interference coating having predetermined spectral transmittance characteristics. Such proposals have been made conventionally to lower a color temperature of a metal halide lamp having a high color temperature to a desired value by using an optical interference coating (usually a multilayer coating). A spectral distribution of light transmitted through a multilayer coating formed on the surface of an arc tube of a metal halide lamp or on the surface of a light transmissive cylindrical tube enclosing the arc tube, changes with the spectral transmittance characteristics of the coating, and the color temperature of the lamp lowers. These proposals have not recognized at all the fact that it is necessary to make the spectral transmittance characteristics have predetermined conditions matching the spectral irradiance of light in the arc tube in order to lower a color temperature by a desired quantity. Therefore, even if these proposals are used in practice, a desired quantity of lowering a color temperature cannot always be ensured. Specifically, first, of layer constitution conditions determining the spectral transmittance characteristics of a multilayer optical interference coating, the condition of a layer thickness (optical thickness) is not positively given. Therefore, depending upon a layer thickness, a quantity of lowering a color temperature becomes insufficient or a color temperature rises so that a desired color temperature cannot be obtained. Moreover, in some cases, a color rendering performance is degraded and a total luminous flux is reduced. Second, the condition of a number of layers is not positively given. Therefore, if the number of layers is small, a quantity of lowering a color temperature is insufficient, whereas if the number of layers is too large, a color temperature lowers excessively below a desired color temperature, and at the same time a color rendering performance of the lamp is degraded and a total luminous flux is reduced.

A low color temperature of about 4000 K or lower is difficult to be realized by a conventional metal halide lamp. Even if it is realized, the color rendering performance is very poor.

To realize a color temperature of 2000 to 3000 K, a high pressure sodium lamp has been used conventionally because it is difficult for a metal halide lamp to realize this temperature range. Of the color rendering performance of a high pressure sodium lamp, Ra is about 85 at the most. Although various improvements have been made, a lamp with Ra of 90 or higher has not been realized as yet.

A color temperature of 3000 to 4000 K has recently been used intentionally for shop illumination, performance illumination, and the like because this temperature range provides calm atmosphere. This temperature range can be realized by conventional metal halide lamps. For example, a metal halide lamp having scandium (Sc)—sodium (Na) based halide as a fill in the arc tube. Ra value of this lamp is about 65 to 70 . Ra of 90 or higher has not been realized even by other kinds of metal halide lamps.

A multilayer optical interference coating may be used for raising a color temperature by setting a proper thickness of each layer of the coating. However, in this case, there are a function of raising a color temperature and a function of lowering a color temperature by the thermal insulation effect of the coating. Because both the functions cancel out, it is difficult to finely control a rise of a color temperature by the coating. It is not effective therefore for controlling a color temperature by the coating if a color temperature of a lamp in a coating-less state is lower than a target color temperature.

SUMMARY OF THE INVENTION

The present invention has been made under the above-described circumstances. It is an object of the present invention to provide a metal halide lamp having a desired color temperature lowered from its inherent high color temperature while maintaining its high lamp luminous efficiency and high color rendering performance, by applying an optical interference coating satisfying predetermined conditions to the metal halide lamp.

The color temperature of irradiation light from a metal halide lamp comprising an arc tube filled with metal halide, mercury and inert gas, electrodes at the opposite ends of the arc tube and a glass housing of housing said arc tube is lowered to 2000–6000 K by a selective transmission coating. The selective transmission coating which transmits irradiation light of longer wavelengths generated between said electrodes and reflects the irradiation light of shorter wavelengths is applied to the outer surface of said arc tube. The selective transmission coating transmits the irradiation light of wavelengths longer than nearly 600 nm and reflects the irradiation light of wavelengths shorter than nearly 600 nm. This coating is particularly effective for a metal halide lamp filled with metal halide which comprises iodides of dysprosium, neodymium and cesium and the color temperature of the irradiation light inside the arc tube is 6000–7500 K.

The invention provides means for lowering a color temperature by an optical interference coating as a visible selective transmittance coating. This means is constituted by the following five approaches.

The first metal halide lamp of the invention includes: an arc tube filled with metal halide, mercury, and inert gas, the arc tube having a color temperature of 4500 to 7500 K of light therein when the arc tube is burnt, and a thermal insulating coating made of fine grains such as metal oxide being coated on outer opposite end surfaces of the arc tube at the area enclosing electrodes; an outer envelope enclosing the arc tube; and a visible selective transmittance coating formed on the outer surface of the arc tube not coated with the thermal insulating coating or on one of the inner and outer surfaces of a light transmissive member enclosing the arc the, wherein the visible selective transmittance coating is made of metal oxide and a multilayer optical interference coating having two or more layers, and has the spectral transmittance characteristics that the transmittance curve of the visible selective transmittance coating has in the wavelength range of 350 to 650 nm substantially one valley hollow like a downward-convex parabola shape having a minimum light transmittance of 80 % or lower in the wavelength range of 350 to 500 nm, and that the visible selective transmittance coating has a light transmittance of 70 % or higher essentially including substantially 90 % or higher in the wavelength range of 600 to 900 nm, and substantially 85% or higher in the wavelength range of 900 to 2000 nm.

For the second metal halide lamp of the invention, in the first metal halide lamp, the metal halide includes at least dysprosium iodide, neodymium iodide, and cesium iodide, a color temperature of light in the arc tube is 6000 to 7500 K when the arc tube is burnt, the visible selective transmittance coating has the spectral transmittance characteristics that the visible selective transmittance coating has a light transmittance of 70 % or higher in the wavelength range of 600 to 700 nm, and substantially 90 % or higher in the wavelength of 700 to 900 nm, a color temperature of light radiated to the outside of the lamp is in the range of 2000 to 6000 K, and a general color rendering index (Ra) of the light is 92 or higher.

For the third metal halide lamp of the invention, in the second metal halide lamp, the visible selective transmittance coating includes as its constituent at least one of a metal oxide combination selected from a group consisting of $Ta_2O_5$ —$SiO_2$, $TiO_2$—$SiO_2$, $ZrO_2$—$SiO_2$, and $Nb_2O_5$—$SiO_2$.

For the fourth metal halide lamp of the invention, in the first metal halide lamp, the metal halide includes at least dysprosium iodide, thallium iodide, and cesium iodide, a color temperature of light in the arc tube is 4500 to 6000 K when the arc tube is burnt, the visible selective transmittance coating is a multilayer interference coating having 3 to 7 layers and has the spectral transmittance characteristics that the transmittance curve of the visible selective transmittance coating has in the wavelength range of 350 to 550 nm substantially one valley hollow like a downward-convex parabola shape having a minimum light transmittance of 30 % or higher and 60 % or lower in the wavelength range of 400 to 500 nm, and that the visible selective transmittance coating has essentially a light transmittance of substantially 90 % or higher in the wavelength range of 600 to 700 nm, a color temperature of light radiated to the outside of the lamp is in the range of 3000 to 4000 K, and a general color rendering index (Ra) of the light is 92 or higher.

For the fifth metal halide lamp of the invention, in the fourth metal halide lamp, the visible selective transmittance coating is made of one or two layer material combinations selected from eight combinations including first combinations of $Ta_2O_5$—$SiO_2$, $TiO_2$—$SiO_2$, $ZrO_2$—$SiO_2$, and $Nb_2O_5$—$SiO_2$, and second combinations of the first combinations added with $Al_2O_3$.

In the first metal halide lamp of this invention, used as a light source formed with a visible selective transmittance coating having the color temperature conversion effects is a metal halide lamp having a color temperature of light in the arc tube when it is burnt. The visible selective transmittance coating is formed on the outer surface of the arc tube or the surface of a light transmissive member enclosing the arc tube. The visible selective transmittance coating has the above-described predetermined spectral transmittance characteristics. Accordingly, a quantity of lowering a color temperature can be easily realized by a desired amount in the range of 500 to 4000 K while maintaining a high lamp luminous efficacy and high color rendering performance, and a metal halide lamp having a color temperature in the range of 2000 to 6000 K can be advantageously provided.

In the second metal halide lamp of this invention, first DY iodide, Nd iodide, and Cs iodide are used as metal halide filled in the arc tube. Accordingly, it is possible to provide a lamp in which a lamp performance is stable, a dispersion of lamp performances is small, and a luminous efficacy is high. Second, the visible selective transmittance coating has the above-described predetermined spectral transmittance characteristics. Accordingly, a metal halide lamp having a color temperature in the wide temperature range of 2000 to 6000 K and Ra of 92 or higher can be advantageously provided. In particular, a metal halide lamp having a low color temperature range of 2000 to 3000 K with a high color rendering performance can be provided which has otherwise cannot be provided conventionally.

In the third metal halide lamp of this invention, the visible selective transmittance coating is excellent in heat resistance and maintains the initial characteristics in the long period of time.

In the fourth metal halide lamp of this invention, Dy iodide, Tl iodide, and Cs iodide are used as metal halide in the arc tube, these materials providing a color temperature near the color temperature range of 3000 to 4000 K in recent high commercial demands. Accordingly, a quantity of lowering a color temperature by the visible selective transmittance coating is small and the layer constitution of the coating is simplified. Next, the visible selective transmittance coating has the above-described predetermined spectral transmittance characteristics. Accordingly, a metal halide lamp having a color temperature in the relatively narrow temperature range of 3000 to 4000 K and Ra of 92 or higher can be provided while maintaining a high color rendering performance particularly at about 3500 K.

In the fifth metal halide lamp of the invention, the visible selective transmittance coating is excellent in heat resistance and maintains the initial characteristics in the long period of time. $Al_2O_3$ is added to the layer material so that the visible selective transmittance coating having a middle refractive index layer in particular has the same function.

DETAILED DESCRIPTION OF THE PREFERRED EMBODIMENTS

A metal halide lamp of this invention will be described with reference to the accompanying drawings.

Of embodiments of a halide lamp using a visible selective transmittance coating, embodiments of a halide lamp whose light in the arc tube has a color temperature of 6000 to 7500 K when the lamp is burnt, will be described first.

Figure 1:
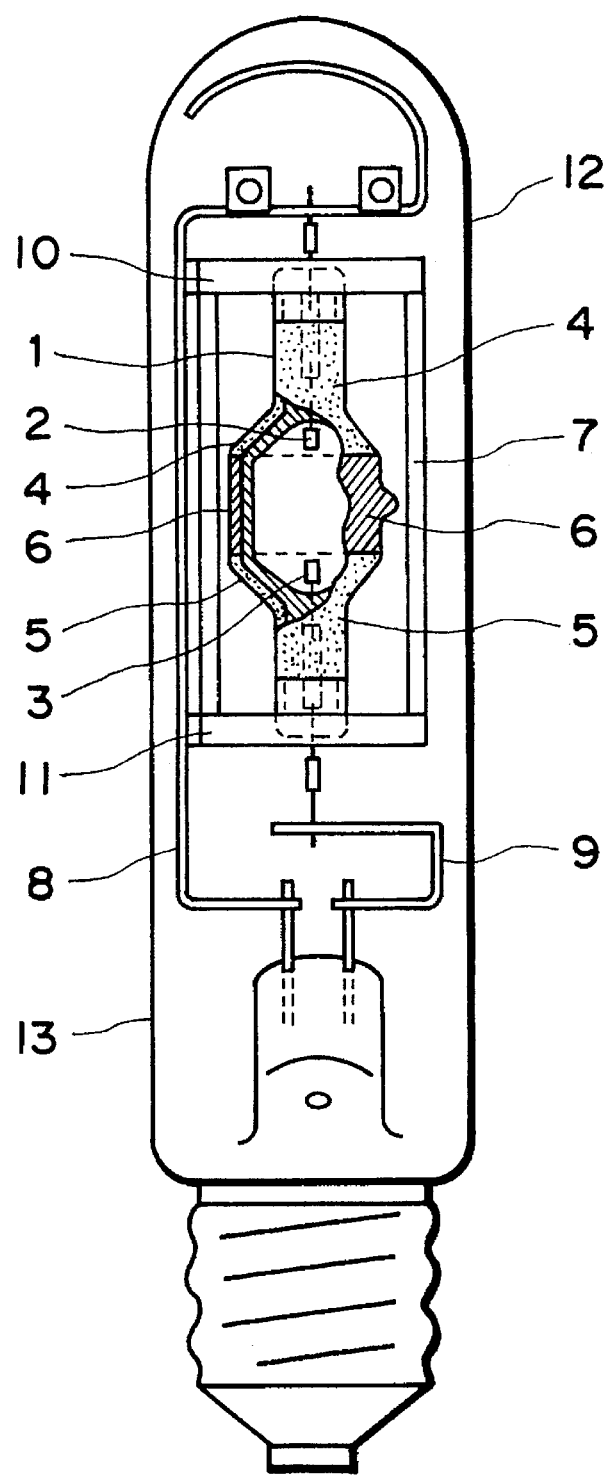
FIG. 1 is a partially broken schematic diagram of a metal halide lamp according to an embodiment of the invention.

FIG. 1 is a partially broken schematic diagram of a metal halide lamp according to a first embodiment.

Reference numeral 1 represents an arc tube made of quartz glass. Electrodes 2 and 3 are sealed and embedded in opposite ends of the arc tube 1. Filled in the inside of the arc tube 1 are dysprosium iodide ($DyI_3$), neodymium iodide ($NdI_3$), cesium iodide (CsI), mercury, and argon gas. Thermal insulating coatings 4 and 5 made of fine grains such as zirconium oxide ($ZrO_2$) are formed on the outer end surfaces of the arc tube 1. The outer surface of the arc tube 1 between the thermal insulating coatings 4 and 5 is formed with a visible selective transmittance coating 6. Reference numeral 7 represents a quartz glass sleeve enclosing the arc tube 1 for preventing splinters of the arc tube form being scattered. Reference numerals 8 and 9 each represent an arc tube support serving also as a lead-in conductor. The arc tube supports 8 and 9 support the arc tube 1 in an outer envelope 12. Reference numerals 10 and 11 represent circular shaped straps. The description of other constituents of the lamp is omitted.

A metal halide lamp 13 (embodiment I) having a rated power of 150 W is constituted in the above way.

The visible selective transmittance coating 6 is a two-layer coating and has a film constitution I shown in Table 1. For example, the first layer is made of tantalum oxide ($Ta_2O_5$) and the second layer is made of silicon dioxide ($SiO_2$).

A film at each layer of the visible selective transmittance coating 6 was formed by a low pressure CVD process. The film can be formed other known process, for example, a CVD process, ion-sputtering or dip-coating process.

TABLE 1

| n | nd (nm) | n | nd (nm) |
|---|---|---|---|
| Layer Constitution I | | Layer Constitution II | |
| S 1.46 | | S 1.46 | |
| 1 2.18 | 105 | 1 2.30 | 74 |
| 2 1.46 | 210 | 2 1.46 | 148 |
| 0 1.00 | | 3 2.30 | 74 |
| | | 0 1.00 | |
| Layer Constitution III | | Layer Constitution IV | |
| S 1.46 | | S 1.46 | |
| 1 2.22 | 65 | 1 2.18 | 62 |
| 2 1.46 | 130 | 2 1.46 | 124 |
| 3 2.22 | 130 | 3 2.18 | 124 |
| 4 1.46 | 130 | 4 1.46 | 124 |
| 5 2.22 | 65 | 5 -2.18 | 131 |
| 0 1.00 | | 6 1.46 | 137 |
| | | 7 2.18 | 69 |
| | | 0 1.00 | |

(Note) In Table, n represents a refractive index, nd represents an physical thickness (a product of a refractive index n and an optical thickness d), S represents a substrate, and 0 represents the air.

Metal halide lamps of embodiments II to IV are constituted by components having the same specifications as the embodiment I except the visible selective transmittance coating formed on the outer surface of the arc tube. A film at each layer of the visible selective transmittance coating was formed by the same method as the embodiment I.

The halide metal lamps of the embodiments II, III, and IV are a three-layer coating, a five-layer coating, and a seven-layer coating, and have the fill constitutions II, III, and IV shown in Table 1, respectively. For example, a high refractive index layer is made of tantalum oxide ($Ta_2O_5$) and a low refractive index layer is made of silicon dioxide ($SiO_2$).

The color temperature conversion effects of the visible selective transmittance coatings of the embodiments I to IV were evaluated in the following manner.

First, metal halide lamps having the specifications same as the embodiments I to IV were manufactured without forming the visible selective transmittance coating on the outer surface of the arc tube, and the lamp characteristics such as a color temperature and a spectral irradiance were measured.

Next, these lamps were broken and only their arc tubes were retrieved. After the visible selective transmittance coatings having the film constitutions I to IV of the embodiments I to IV were formed on the outer surfaces of the arc tubes by a known method, and the lamps were again assembled to complete the metal halide lamps of the embodiments I to IV. Then, the lamp characteristics such as a color temperature and a spectral irradiance of these lamps with the visible selective transmittance coating were measured.

Table 2 shows a color temperature, a color temperature variation relative to a coating-less state, a general color rendering index (Ra), and chromaticity coordinates (x, y) of each metal halide lamp of the embodiments I to IV while it is burnt. The lamp characteristics in a coating-less state of the embodiments I to IV showed a total luminous flux of 11500 to 12000 lm, a color temperature of 6490 to 6530 K, a general color rendering index (Ra) of all 95, and chromaticity coordinates of x=0.312 to 0.313 and y=0.330 to 0.333.

TABLE 2

| Rendering | Color Temperature (K.) | Color Temperature Variation (K.) | General Color Index (Ra) | Chromaticity Coordinates x | y | Total Luminous Flux (lm) |
| --- | --- | --- | --- | --- | --- | --- |
| Embodiment I | 5530 | −980 | 94 | 0.332 | 0.348 | 11980 |
| Embodiment II | 4590 | −1940 | 94 | 0.358 | 0.365 | 11930 |
| Embodiment III | 3490 | −3000 | 92 | 0.404 | 0.385 | 11020 |
| Embodiment IV | 2600 | −3910 | 92 | 0.464 | 0.406 | 9500 |

Figure 3A:
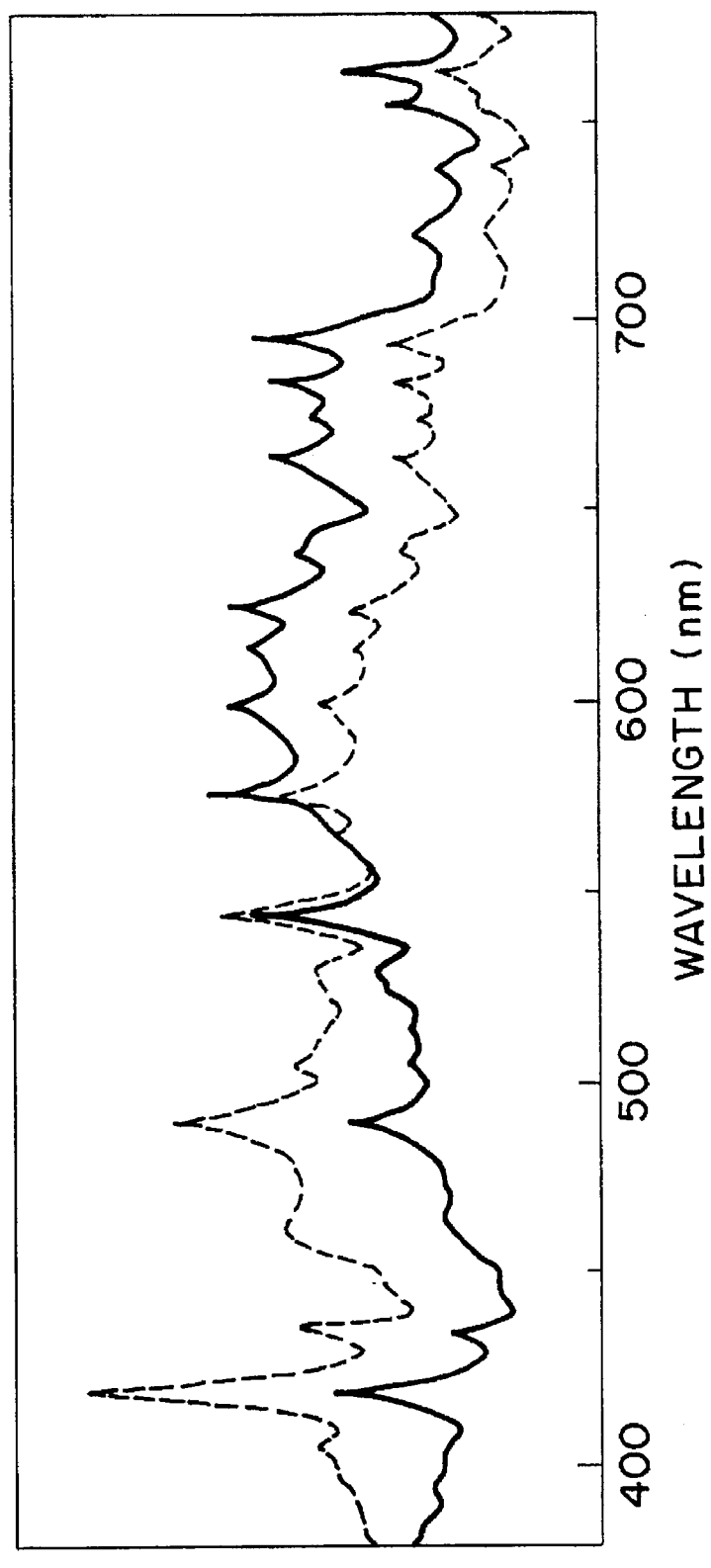
FIG. 3A is a graph showing spectral irradiances of metal halide lamps wherein a solid line indicates a spectral irradiance of a metal halide lamp of an embodiment III of the invention, and a broken line indicates a spectral irradiance of a metal halide lamp of the embodiment III without a visible selective transmittance coating formed on the outer surface of the arc tube.

Of the embodiments I to IV, the spectral irradiance of the metal halide lamp of the embodiment III is shown in FIG. 3A.

In FIG. 3A, a solid line shows the characteristics of the metal halide lamp with the visible selective transmittance coating being formed, and a broken line shows the characteristics of the metal halide lamp without the visible selective transmittance coating.

As seen from FIG. 3A, the emission constituent on the short wavelength side relative to a boarder wavelength of about 550 nm reduces uniformly and considerably as compared to the coating-less case, whereas the emission constituent on the long wavelength side relative to about 550 nm increases uniformly as compared to the coating-less case. A spectral irradiance change depending upon a presence/ absence of a coating is reflected upon a color temperature variation from a color temperature of 6490 K in the absence state of a coating to a color temperature of 3490 K in the presence state of a coating.

Figure 3B:
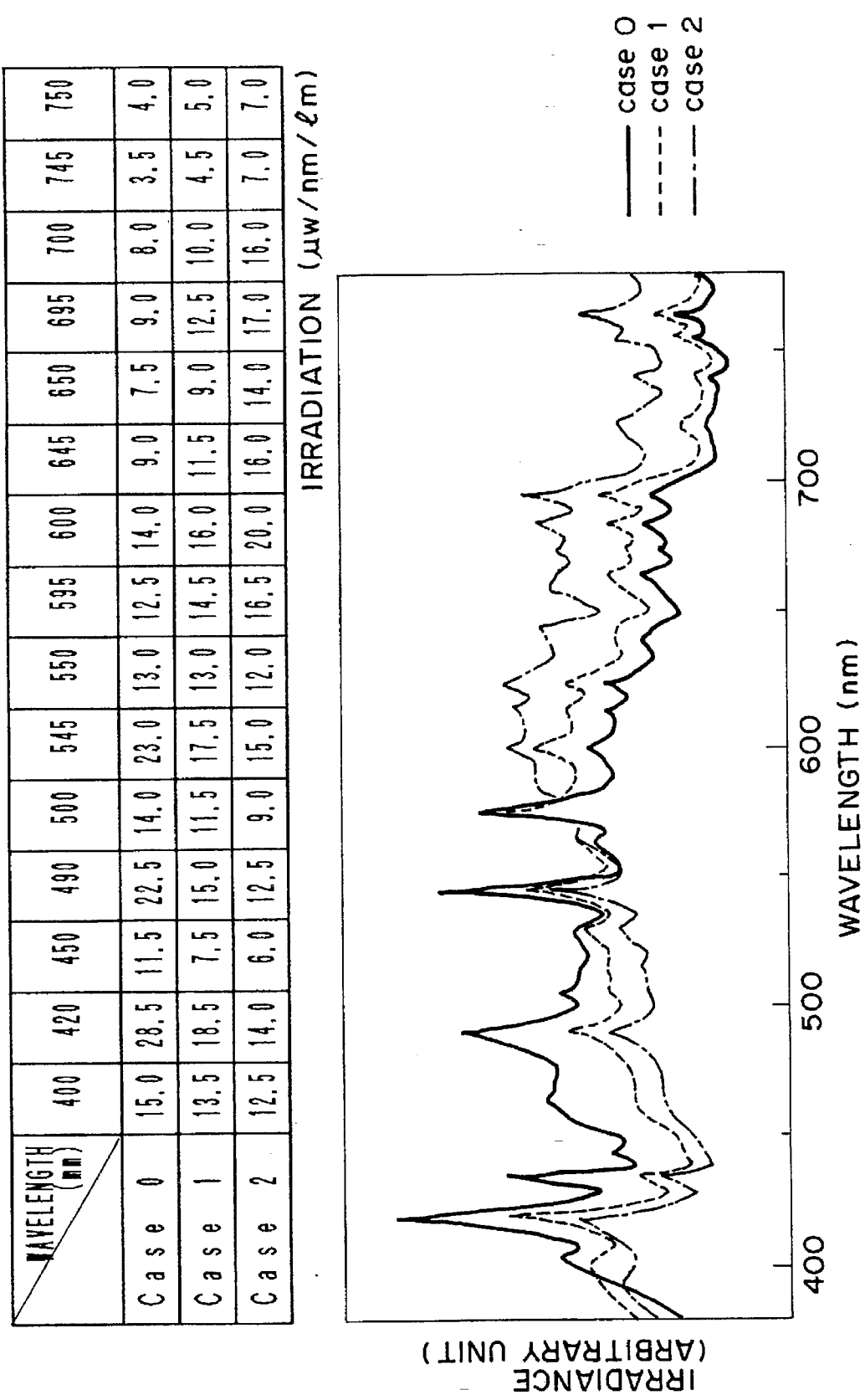
FIG. 3B is a graph showing spectral irradiances of three types of metal halide lamp, a first type being provided with no selective transmittance coating (case 0), second type being provided with a selective transmittance coating on the outer surface of the sleeve (case 1) and third type being provided with the same selective transmittance coating on the outer surface of the arc tube (case 2).
Figure 4:
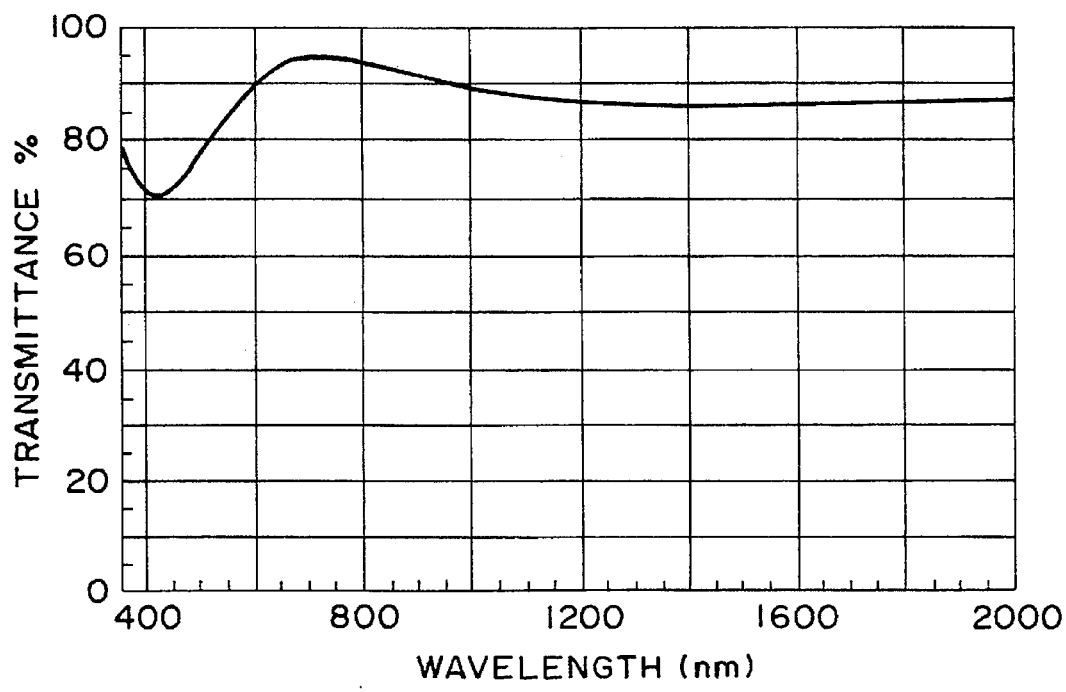
FIG. 4 is a graph showing the spectral transmittance characteristics of a visible selective transmittance coating applied to a metal halide lamp of the embodiment I.
Figure 5:
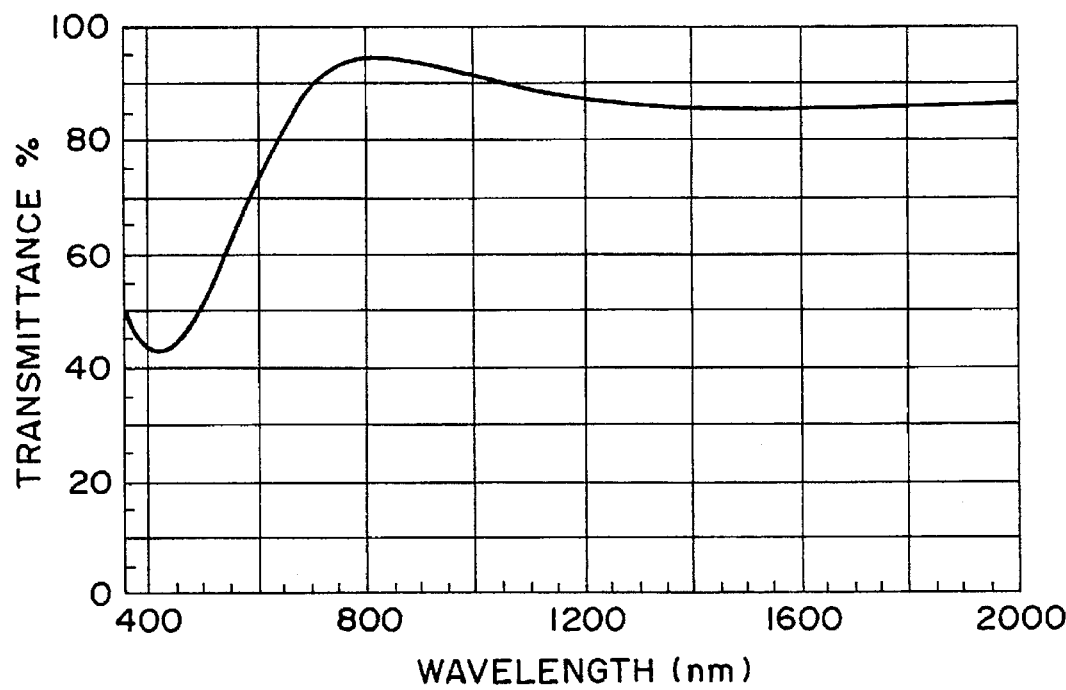
FIG. 5 is a graph showing the spectral transmittance characteristics of a visible selective transmittance coating applied to a metal halide lamp of an embodiment II.
Figure 6:
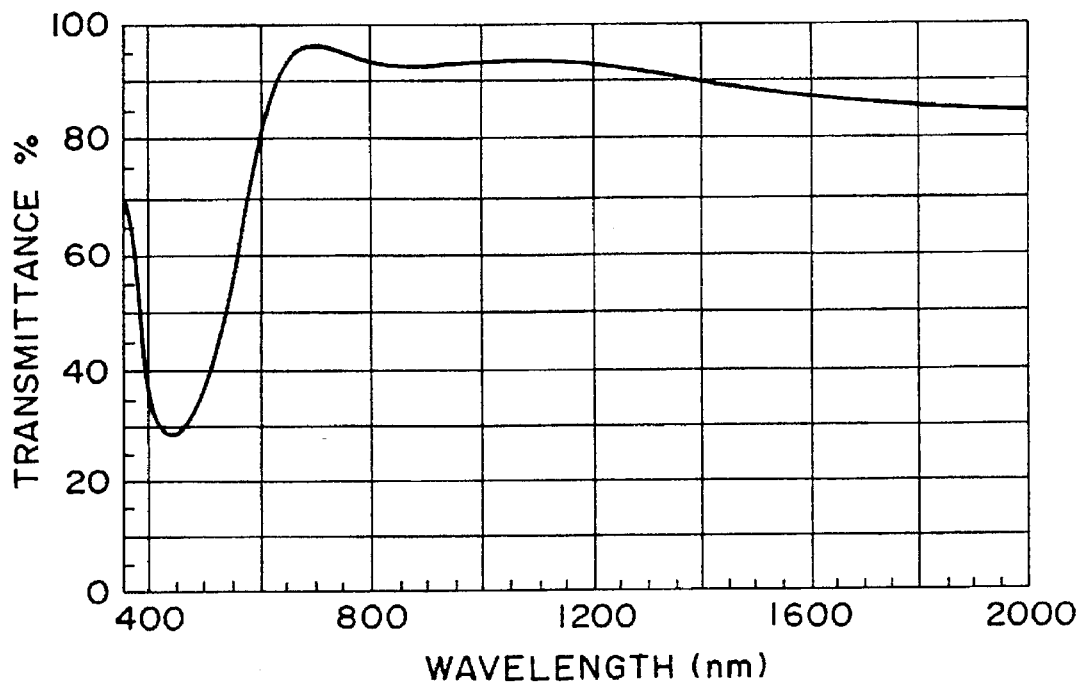
FIG. 6 is a graph showing the spectral transmittance characteristics of a visible selective transmittance coating applied to a metal halide lamp of an embodiment III.
Figure 7:
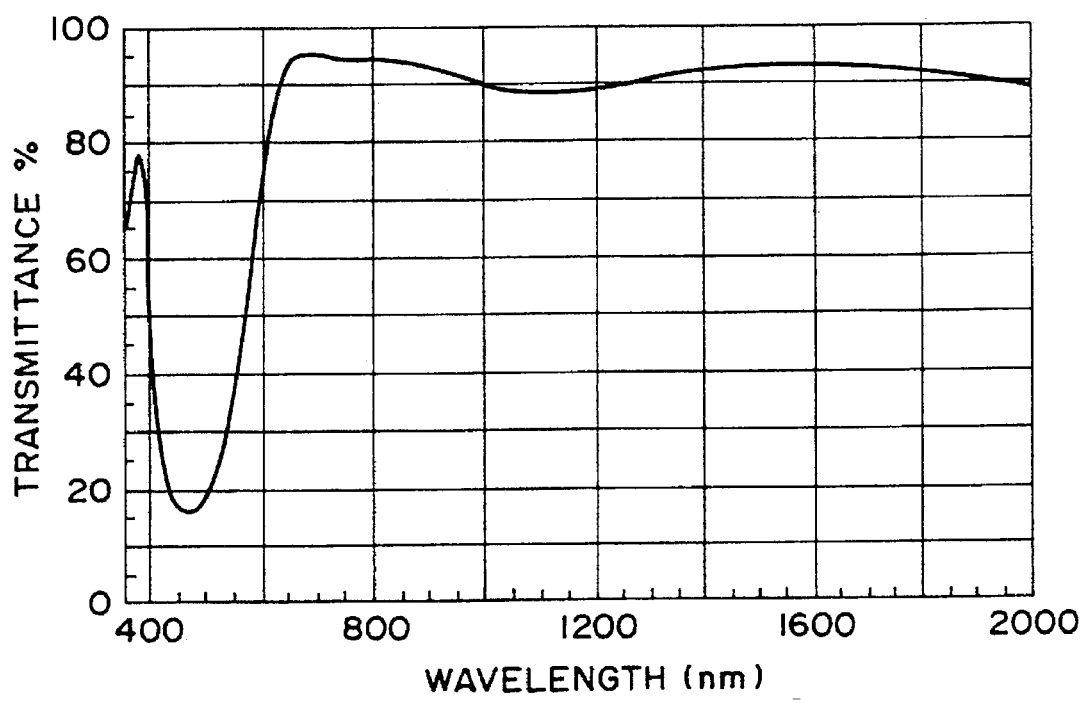
FIG. 7 is a graph showing the spectral transmittance characteristics of a visible selective transmittance coating applied to a metal halide lamp of an embodiment IV.

From the irradiance spectrum of FIG. 3A, we learned an unique fact that the irradiation at the wavelengths longer than 550 nm is significantly enhanced with applying the selective transmittance coating which transmits the irradiation light of wavelengths longer than about 600 nm, but reflects the irradiation light of wavelengths shorter than about 600 nm. This fact was unexpected phenomenon. To the end of confirming this fact, we conducted the following experiment. Case 0: No selective transmission coating is applied to the lamp of FIG. 1. Case 1: A selective transmission coating of seven layers of table 1—coating IV, which has the transmission characteristics of FIG. 7 was applied to the outer surface of sleeve 7 of the lamp of FIG. 1. Case 2: The same selective transmission coating as that of case 1 is applied to the outer surface of arc tube 1. The experimental results for the irradiance spectrum are shown in FIG. 3B. For the irradiance spectra of cases 1 and 2 at the wavelengths shorter than about 550 nm, the difference in irradiance attenuation was not so significant. However, for the wavelengths longer than about 550 nm, the difference in irradiance enhancement between case 1 and 2 was significant. The enhancement in case 2 is about three times that of case 1. Consequently, the color temperatures of case 0, 1 and 2 were 6983K, 4578K and 3362K.

By applying the selective transmission coating which transmits the irradiation light of wavelengths longer than about 600 nm and reflects the irradiation light of wavelengths shorter than about 600 nm onto the outer surface of an arc tube, the color temperature can be effectively lowered without deteriorating the irradiation power efficiency.

By using one kind of arc tubes each having a color temperature of about 6500 K of light radiated in the arc tube and adjusting the spectral transmittance characteristics of each visible selective transmittance coating formed on the outer surface of the arc tube, four halide lamps can be obtained which have four different color temperatures within a color temperature range of 2000 to 6000 K, each temperature being lower than about 6500 K in unit of about 1000 K step.

As seen from the Ra values and chromaticity coordinates (x, y) shown in Table 2, all the metal halide lamps of the embodiments I to IV had an Ra value of 92 or higher and showed an excellent color rendering property that the chromaticity coordinates are on a black body locus.

The spectral transmittance characteristics of a visible selective transmittance coating of each metal halide lamp were measured in the following manner.

Two arc tubes having the same specifications were manufactured and the visible selective transmittance coatings were formed on the outer surfaces thereof, one of them was broken, and the spectral transmittance of the coating on the surface of an obtained splinter was measured.

The spectral transmittance characteristics of the visible selective transmittance coatings of the embodiments I to IV are respectively shown in FIGS. 4, 5, 6, and 7.

It is well known that the shape of the spectral transmittance characteristic curve of a visible selective transmittance coating changes in various ways with a combination of a refractive index and thickness of each layer constituting the coating. Many studies on a change in a spectral transmittance curve of a coating were made by changing in various ways a combination of a refractive index and thickness of each layer.

It has been found that a color temperature of 6000 to 7500 K of light of a light source applied with a visible selective transmittance coating can be lowered without fail by a desired value in the range of 500 to 4000 K while maintaining a high lamp luminous efficacy and color rendering property, so long as the following conditions are satisfied. Lowering a color temperature can be realized not only by the above-described embodiments but also by any practicable combination of refractive index and thickness of a layer constituting the coating (inclusive of a different number of layers). The conditions to be satisfied are the condition that a visible selective transmittance coating is a multilayer coating whose number of layers is 2 or more and the condition of the spectral transmittance characteristics that the spectral transmittance curve of a coating has in the wavelength range of 350 to 650 nm substantially one valley hollow like a downward-convex parabola shape having a minimum light transmittance of 80 % or lower in the wavelength range of 350 to 500 nm, and that the visible selective transmittance coating has a light transmittance of 70 % or higher in the wavelength range of 600 to 700 nm, 90 % or higher in the wavelength range of 700 to 900 nm, and substantially 85% or higher in the wavelength range of 900 to 2000 nm.

If the conditions are not satisfied, several deficiencies occur which will be described in the following.

First, with regard to the number of layers of a visible selective transmittance coating, if a visible selective transmittance coating is a single-layer coating, it is difficult to obtain the spectral transmittance characteristics that light only in a relatively narrow wavelength range of 400 to 500 nm most effective for lowering a color temperature is reflected.

Figure 8:
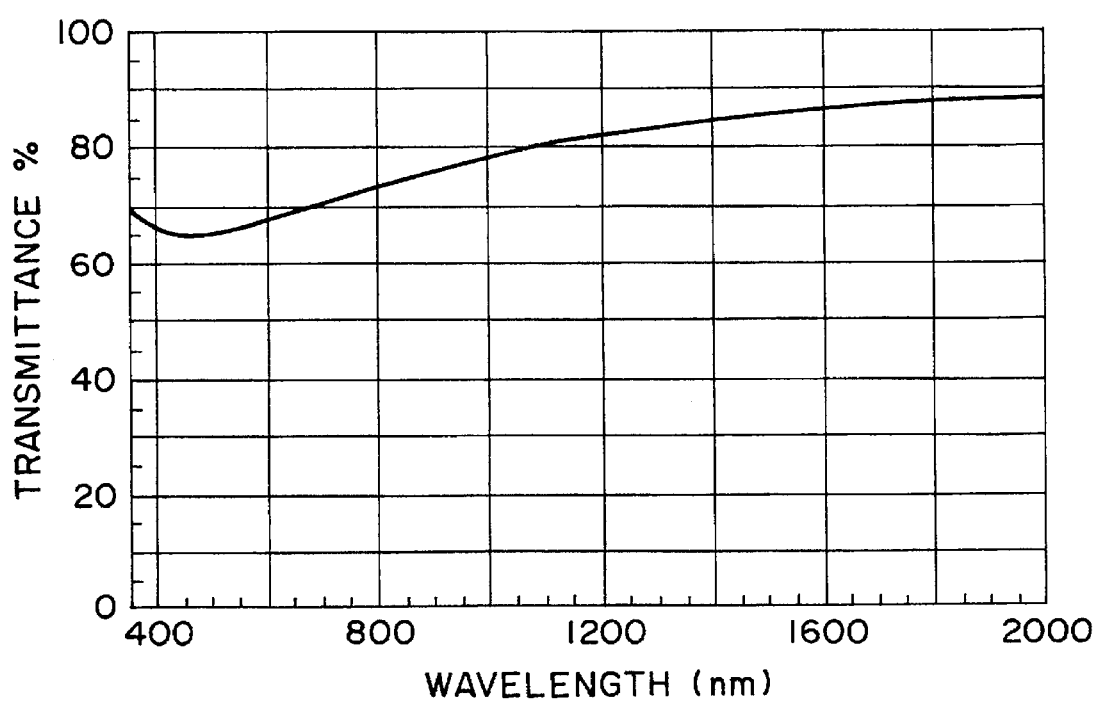
FIG. 8 is a graph showing an example of the spectral transmittance characteristics of a single-layer coating.

FIG. 8 shows an example of the spectral transmittance characteristics of a single-layer coating. As seen from FIG. 8, even if a minimum transmittance is set in the wavelength range of 400 to 500 nm, the reflectance region expands on both sides of this range. Accordingly, if a single-layer coating is used, a quantity of lowering a color temperature is less than 500 K and not sufficient.

It is therefore preferable to set the number of layers to 2 or more and to form a coating by alternately laminating two kinds of thin films having different refractive indices.

Next, with regard to the depth and position of a valley hollow of a spectral transmittance curve, if a minimum transmittance at the valley hollow is over 80 %, a quantity of lowering a color temperature is less than 500 K and not sufficient. If a minimum transmittance at the valley hollow is located in the wavelength region longer than 500 nm, a quantity of lowering a color temperature becomes less than 500 K or a color temperature is raised so that this arrangement is not preferable. As the number of layers of a visible selective transmittance coating is increased, a minimum transmittance at the valley hollow of a spectral transmittance curve lowers near to 0 %. In this case, however, a quantity of lowering a color temperature is small and inefficient irrespective of a large number of layers, and light transmitted through the coating becomes perfect colored light.

Accordingly, in order to avoid perfect colored light, it is desired to make a visible selective transmittance coating have eight layers or smaller and to regulate the transmittance characteristics so that a minimum transmittance at the valley hollow of a spectral transmittance curve is about 15% or higher.

Further, with regard to a light transmittance of a coating in the wavelength ranges of 600 to 700 nm and 700 to 900 nm, if the light transmittances at these ranges are 70 % or lower and 90 % or lower, respectively, a quantity of lowering a color temperature is not sufficient or a color temperature is raised so that this arrangement is not preferable, even if a principal valley hollow of a spectral transmittance curve is located at a predetermined position on the short wavelength side of a visible light region.

In the above embodiments, although a visible selective transmittance coating is formed on the outer surface of an arc tube of a metal halide lamp, it maybe formed on the surface of an outer envelope of the lamp, or on the surface of a light transmissive lamp constituent member such as a cylindrical sleeve enclosing the arc tube.

Figure 2:
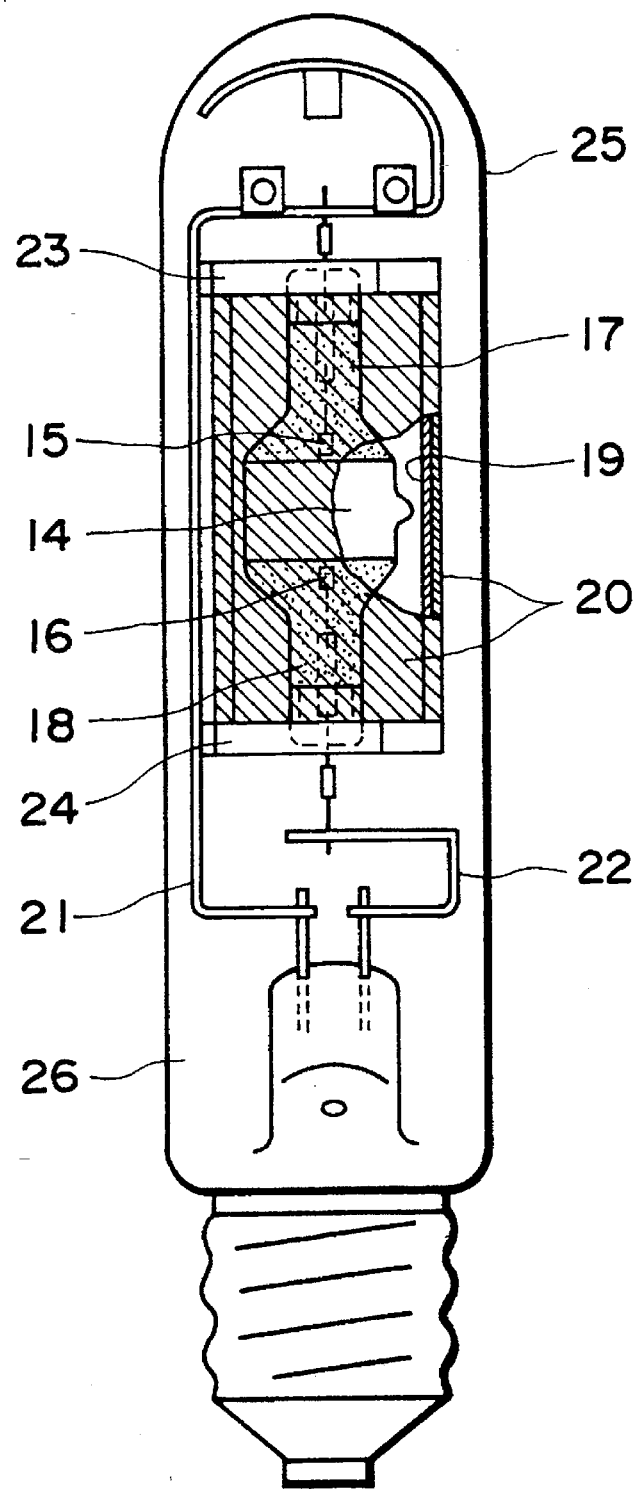
FIG. 2 is a partially broken schematic diagram of a metal halide lamp according to another embodiment of the invention.

FIG. 2 is a partially broken schematic diagram of a metal halide lamp according to another embodiment.

Reference numeral 14 represents an arc tube made of quartz glass. Electrodes 15 and 16 are sealed and embedded in opposite ends of the arc tube 14. Predetermined substances are filled in the inside of the arc tube 14. Thermal insulating coatings 17 and 18 are formed on the outer end surfaces of the arc tube 14. Reference numeral 19 represents a quartz glass cylindrical sleeve enclosing the arc tube 14. A visible selective transmittance coating 20 is formed on the outer surface of the sleeve 19. Reference numerals 21 and 22 each represent a lead-in conductor. Reference numerals 23 and 24 represent straps. Reference numeral 25 represents an outer envelope made of, for example, hard glass. The description of other constituents of the lamp is omitted.

A metal halide lamp 26 (embodiment V) having a rated power of 150 W is constituted in the above way.

The visible selective transmittance coating 20 maybe formed on the inner surface of the sleeve 19, or on the outer or inner surface of the outer envelope 25. However, if the visible selective transmittance coating 20 is formed on both the inner and outer surfaces of the sleeve 19 or outer envelope 25, light passes through the two coatings and a quantity of lowering a color temperature of light from the arc tube becomes too large. It is therefore preferable to form the visible selective transmittance coating 20 on the inner or outer surface of the sleeve 19 or outer envelope 25. It is preferable from the same reason to form the visible selective transmittance coating 20 only on one surface of one of three components including the arc tube 14, sleeve 19, and outer envelope 25.

In the first embodiment, a combination of $Ta_2O_5$—$SiO_2$ is used as metal oxide constituting the visible selective transmittance coating. In this embodiment, it is sufficient if the visible selective transmittance coating has at least one of combinations of $Ta_2O_5$—$SiO_2$, $TiO_2$—$SiO_2$, $ZrO_2$—$SiO_2$, and $Nb_2O_5$—$SiO_2$. If a middle refractive index layer is to be used as one constituent element of the visible selective transmittance coating, aluminum oxide ($Al_2O_3$) is used in the form of a single thin layer or in the form of mixed oxide.

Of embodiments of a halide lamp using a visible selective transmittance coating, embodiments of a halide lamp whose light in the arc tube has a color temperature of 4500 to 6000 K when the lamp is burnt, will be described.

A metal halide lamp of an embodiment VI has a rated power of 150 W and the same lamp components as the embodiments I to IV, except a fill in the arc tube and the visible selective transmittance coating. The visible selective transmittance coating 6 is formed on the outer surface of the arc tube 1 interposed between the thermal insulating coatings 4 and 5 (FIG. 1). Filled in the arc tube 1 are dysprosium iodide ($DyI_3$), thallium iodide (TlI), cesium iodide (CsI), mercury, and argon gas.

The visible selective transmittance coating 6 is a five-layer coating and has a film constitution V shown in Table 3. For example, the first, third, and fifth layers are made of tantalum oxide ($Ta_2O_5$) and the second and fourth layers are made of silicon dioxide ($SiO_2$).

A film at each layer of the visible selective transmittance coating 6 was formed by a known method. For example, in the case of a low pressure CVD process, the arc tube 1 before the assembly of the metal halide lamp 13 was placed in a reactor. A $Ta_2O_5$ first layer was formed under the predetermined coating conditions such as temperature and pressure by using tantalum alkoxide and oxygen as source materials. Next, an SiO₂ second layer was formed under the predetermined coating conditions such as temperature and pressure. Thereafter, in the similar manner as above, a $Ta_2O_5$ third layer, an $SiO_2$ fourth layer, and a $Ta_2O_5$ fifth layer were sequentially formed.

TABLE 3

| n | nd (nm) | n | nd (nm) |
|---|---|---|---|
| Layer Constitution V | | Layer Constitution VI | |
| S 1.46 | | S 1.46 | |
| 1 2.10 | 65 | 1 2.18 | 121 |
| 2 1.46 | 130 | 2 1.46 | 92 |
| 3 2.10 | 130 | 3 2.18 | 116 |
| 4 1.46 | 130 | 4 1.46 | 83 |
| 5 2.10 | 65 | 5 2.18 | 110 |
| 0 1.00 | | 6 1.46 | 74 |
| | | 0 1.00 | |
| Layer Constitution VII | | Layer Constitution VIII | |
| S 1.46 | | S 1.46 | |
| 1 2.13 | 64 | 1 1.62 | 62 |
| 2 1.46 | 128 | 2 2.13 | 62 |
| 3 2.13 | 128 | 3 1.46 | 124 |
| 4 1.46 | 128 | 4 2/13 | 124 |
| 5 2.13 | 64 | 5 1.46 | 124 |
| 6 1.46 | 64 | 6 2/13 | 62 |
| 0 1.00 | | 7 1/46 | 62 |
| | | 0 1.00 | |
| Layer Constitution IX | | Layer Constitution X | |
| S 1.46 | | S 1.46 | |
| 1 2.18 | 104 | 1 2.13 | 75 |
| 2 1.46 | 79 | 2 1.46 | 150 |
| 3 2.18 | 100 | 3 2.13 | 150 |
| 4 1.46 | 71 | 4 1.46 | 150 |
| 5 2.18 | 95 | 5 2.13 | 75 |
| 6 1.46 | 63 | 6 1.46 | 75 |
| 0 1.00 | | 0 1.00 | |
| Layer Constitution XI | | Layer Constitution XII | |
| S 1.46 | | S 1.46 | |
| 1 2.13 | 65 | 1 2.18 | 65 |
| 2 1.46 | 130 | 2 1.46 | 130 |
| 3 2.13 | 130 | 3 2.18 | 130 |
| 4 1.46 | 130 | 4 1.46 | 130 |
| 5 2.13 | 130 | 5 2.18 | 130 |
| 6 1.46 | 130 | 6 1.46 | 130 |
| 7 2.13 | 65 | 7 2.18 | 65 |
| 0 1.00 | | 8 1.46 | 65 |
| | | 0 1.00 | |

(Note) In Table, n represents a refractive index, nd represents an optical thickness (product of a refractive index n and an optical thickness d), S represents a substrate, and 0 represents the air.

In order to evaluate the color temperature conversion effects of the visible selective transmittance coatings 6, metal halide lamps having the specifications same as the embodiments VI were manufactured without forming the visible selective transmittance coating on the outer surface of the arc tube 1, and the lamp characteristics without the visible selective transmittance coating were measured.

Figure 9:
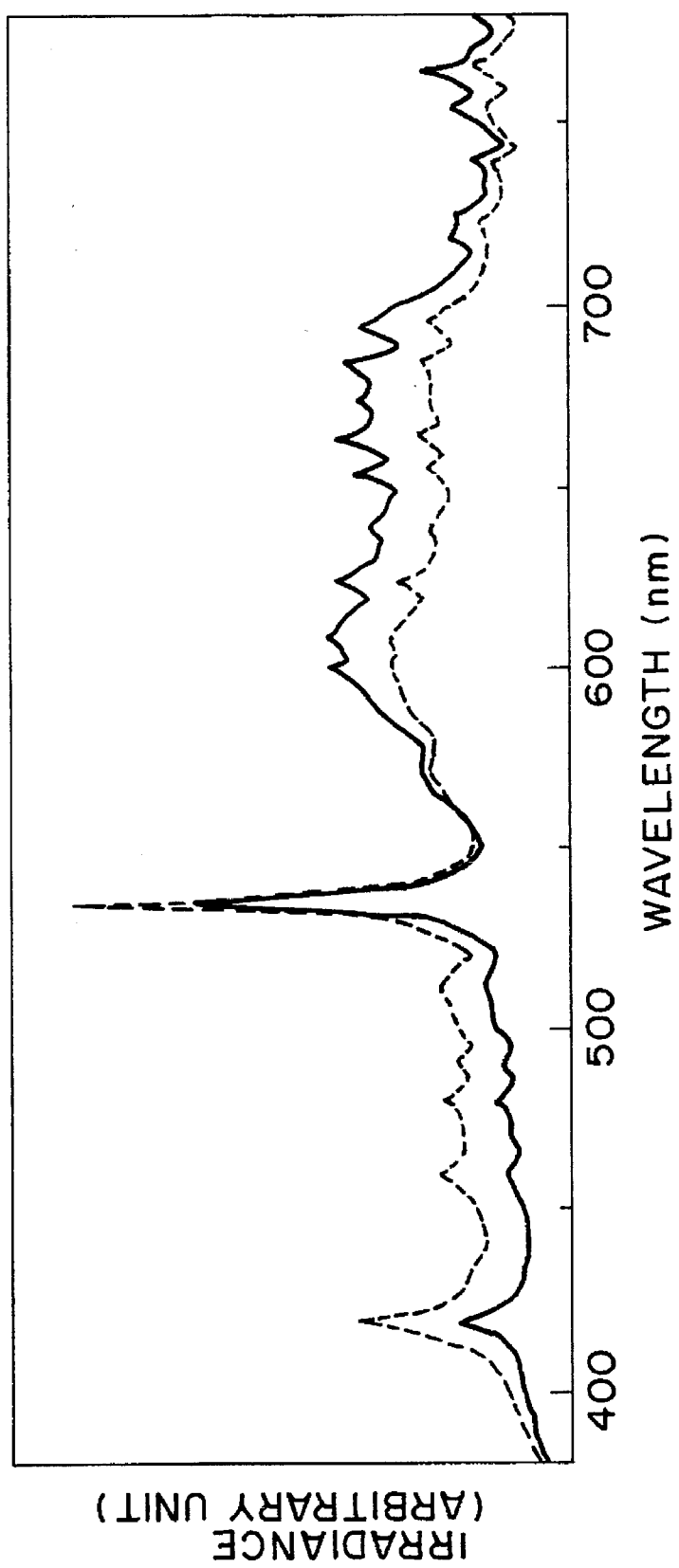
FIG. 9 is a graph showing spectral irradiances of metal halide lamps wherein a solid line indicates a spectral irradiance of a metal halide lamp of an embodiment VI of the invention, and a broken line indicates a spectral irradiance of a metal halide lamp of the embodiment VI without a visible selective transmittance coating formed on the outer surface of the arc tube.

The spectral irradiance had a spectral distribution indicated by a broken line in FIG. 9 specific to a Dy—Tl based metal halide lamp which has an emission peak of dysprosium (Dy) atoms near at 420 nm and an emission peak of thallium (Tl) atoms near at 535 nm.

This lamp had a color temperature of 5020 K, a general color rendering index (ra) of 95, and a total luminous flux of 11210 nm, respectively when the lamp was burnt at a rated power.

Next, this lamp was broken and only its arc tube 1 was retrieved. After the visible selective transmittance coating 6 (five-layer coating) was formed on the outer surface of the arc tube 1, for example, by a low pressure CVD process, the lamp was again assembled to complete the metal halide lamp 13 of the embodiment VI.

The lamp characteristics were measured. The spectral irradiance of this lamp had a spectral distribution indicated by a solid line in FIG. 9. The spectral irradiance on the side of a wavelength shorter than about 550 nm reduced greatly as compared to the state without the visible selective transmittance coating 6 (broken line in FIG. 9), whereas the spectral irradiance on the side of a wavelength longer than about 550 nm increased considerably.

This lamp had a color temperature of 3360 K lowered by 1660 K than the case without the visible selective transmittance coating 6, when the lamp was burnt at a rated power.

Raw as 96 hardly changing from the coating-less state and the total luminous flux was 11120 nm slightly reduced from the coating-less state (refer to Table 4).

TABLE 4

| Rendering | Color Temperature (K.) | Color Temperature Variation (K.) | General Color Index (Ra) | Total Luminous Flux (lm) |
|---|---|---|---|---|
| Embodiment VI | 3360 | −1660 | 96 | 11120 |
| Embodiment VII | 3450 | −1620 | 95 | 11050 |
| Embodiment VIII | 3300 | −1870 | 94 | 11100 |
| Embodiment IX | 3570 | −1610 | 92 | 11030 |
| Comparative Example I | 2390 | −2700 | 85 | 9890 |
| Comparative Example II | 4870 | −170 | 90 | 11200 |
| Comparative Example III | 2420 | −2630 | 87 | 10080 |
| Comparative Example IV | 5730 | +620 | 76 | 8270 |

The spectral transmittance characteristics of the visible selective transmittance coating 6 (five-layer coating) of each metal halide lamp were measured in the following manner.

Two arc tubes 1 having generally the same structure were manufactured and the visible selective transmittance coatings were formed on the outer surfaces thereof, one of them was broken, and the spectral transmittance of the coating on the surface of an obtained splinter was measured.

Figure 10:
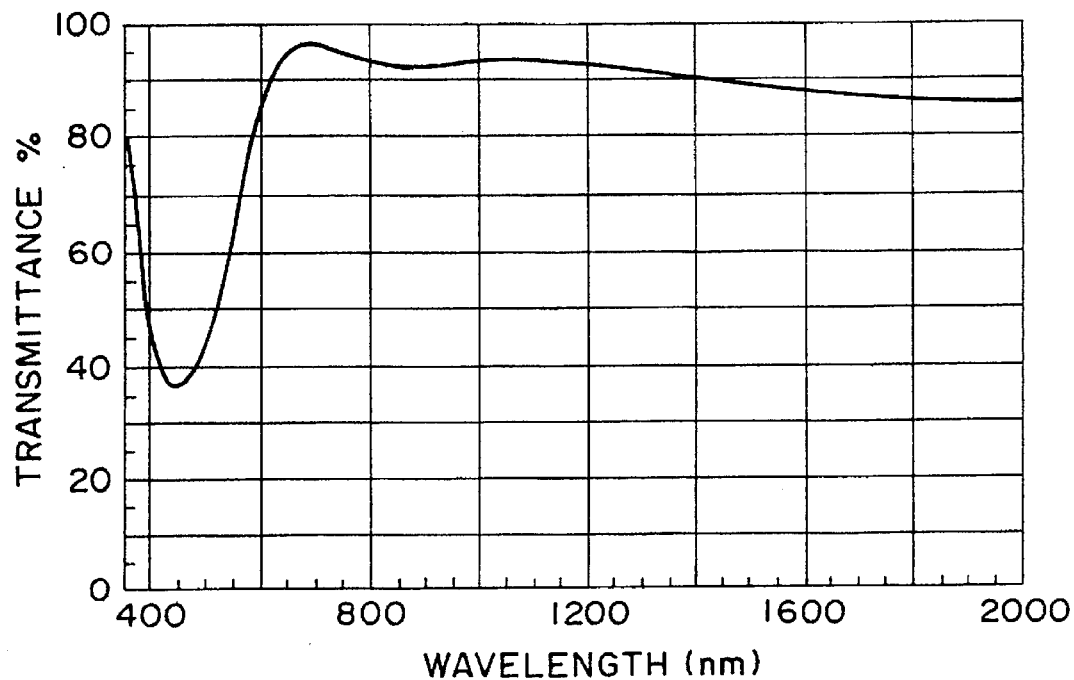
FIG. 10 is a graph showing the spectral transmittance characteristics of a visible selective transmittance coating applied to a metal halide lamp of the embodiment VI.

The spectral transmittance characteristics shown in FIG. 10 were obtained. As seen from FIG. 10, the spectral transmittance curve of the visible selective transmittance coating 6 had a large valley hollow in the wavelength range of 350 to 550 nm and the minimum transmittance was 35% located near at 445 nm.

A seventh embodiment of the invention will be described next. The specification of the metal halide lamp of the embodiment VII is the same as the embodiment VI excepting the visible selective transmittance coating. The visible selective transmittance coating is a six-layer coating and has a layer constitution VI shown in Table 3. The first, third, and fifth layers are made of, for example, titanium oxide ($TiO_2$) and the second, fourth, and sixth layers are made of, for example, silicon dioxide ($SiO_2$). The six-layer coating was formed by a coating method similar to the embodiment VI. The spectral transmittance characteristics of the six-layer coating and the color temperature conversion effects of the lamp were measured in a manner similar to the embodiment VI.

Figure 11:
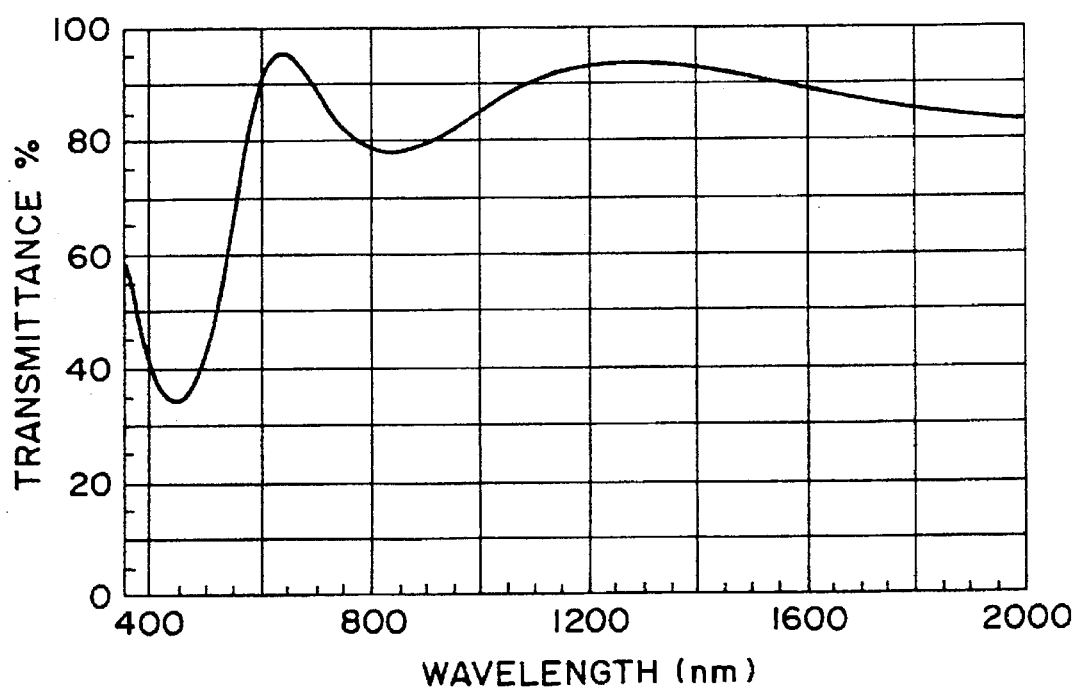
FIG. 11 is a graph showing the spectral transmittance characteristics of a visible selective transmittance coating applied to a metal halide lamp of an embodiment VII.

The spectral transmittance characteristics of the six-layer coating shown in FIG. 11 were obtained. The spectral transmittance curve had a large valley hollow in the wavelength range of 350 to 550 nm and the minimum transmittance was 34% located near at 440 nm.

The metal halide lamp of this embodiment VII had a color temperature of 3450 K lowered by 1620 K than the coating-less case, when the lamp was burnt at a rated power. Ra was 95 hardly changing from the coating-less state (94) and the total luminous flux was 11050 nm slightly reduced from the coating-less state (11300 lm) (refer to Table 4).

As stated earlier, it is well known that the shape of the spectral transmittance characteristic curve of a visible selective transmittance coating changes in various ways with a combination of a refractive index and thickness of each layer constituting the coating. Many studies described earlier on a visible selective transmittance coating were made, and the following fact has been found.

A color temperature of light in an arc tube can be lowered by a visible selective transmittance coating without fail by a desired value in the range of 1000 to 2500 K while maintaining a high lamp luminous efficacy and color rendering property, so long as the following conditions are satisfied. Lowering a color temperature can be realized not only by the above-described two embodiments VI and VII but also by any practicable combination of refractive index and thickness of a layer constituting the coating, while providing the same effects as the two embodiments VI and VII. The conditions to be satisfied are the condition that a visible selective transmittance coating is a multilayer coating whose min-number of layers is 3 or more and the condition of the spectral transmittance characteristics that the spectral transmittance curve of a coating has in the wavelength range of 350 to 550 nm substantially one valley hollow like a downward-convex parabola shape having a minimum light transmittance of 30 % or higher and 60 % or lower in the wavelength range of 400 to 500 nm, and that the visible selective transmittance coating has a light transmittance of 70 % or higher in the wavelength range of 600 to 900 nm, at least partially 90 % or higher in the wavelength range of 600 to 700 nm, and substantially 85% or higher in the wavelength range of 900 to 2000 nm. As a result, a Dy—Tl based metal halide lamp having a color temperature of 4500 to 6000 K of light in the arc tube can radiate light having a color temperature of 3000 to 4000 K while maintaining a high lamp luminous efficacy and color rendering property.

If the condition of the spectral transmittance characteristics of a visible selective transmittance coating to be used was not satisfied, not only a color temperature of the Dy—Tl based metal halide lamp was unable to be lowered to a target temperature of 300 to 4000 K but also the color rendering property was degraded and the total luminous flux was reduced. These deficiencies will be described in the following.

First, with regard to the number of layers, if a visible selective transmittance coating is a two-or single-layer coating, a quantity of lowering a color temperature is less than 700 K and not sufficient. If a visible selective transmittance coating is a coating having eight or more layers, a quantity of lowering a color temperature is over 2500 K so that the Dy—Tl based metal halide lamp using a visible selective transmittance coating is required to have a color temperature lower than 3000 K which is out of the desired range.

Figure 14:
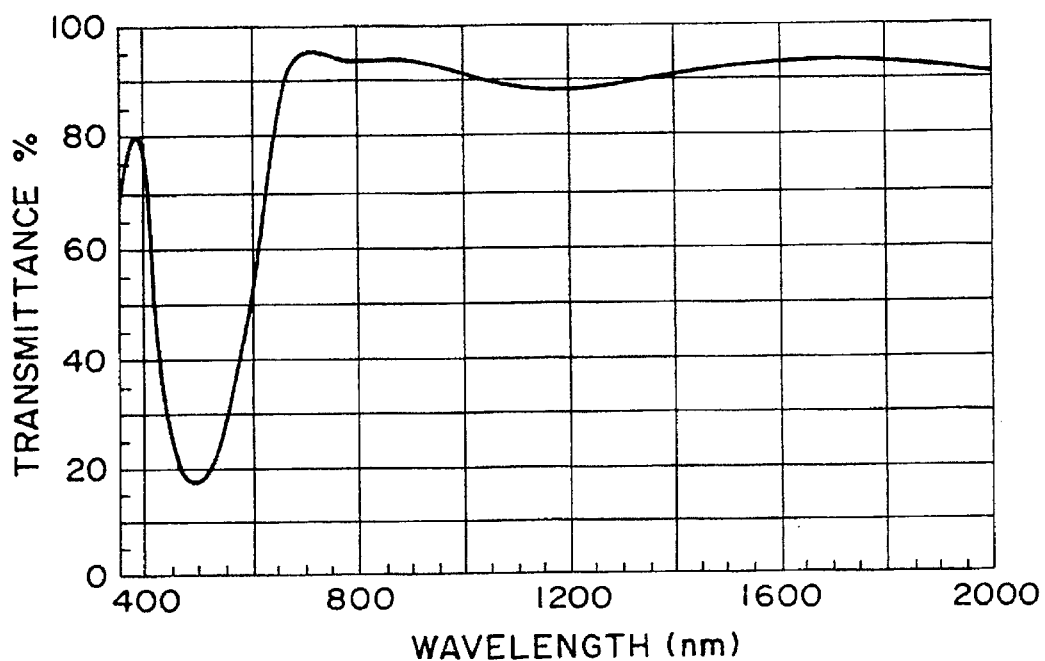
FIG. 14 is a graph showing the spectral transmittance characteristics of a visible selective transmittance coating applied to a metal halide lamp of a comparative example I.

For example, the eight-layer coating having a layer constitution XII shown in Table 3 has the spectral transmittance characteristics shown in FIG. 14. Although a minimum transmittance was in the wavelength range of 400 to 500 nm, the minimum transmittance was lower than 30 %. The lamp characteristics of a metal halide lamp using this eight-layer coating (comparative example I) are shown in Table 4. Although a quantity of lowering a color temperature by the coating was as large as 2700 K, Ra was 85 considerably reduced as compared to the coating-less state, and the total luminous flux was greatly reduced.

These deficiencies maybe considered resulting from that this eight-layer coating considerably cuts visible light in a broad range (400 to 600 nm) as seen from the spectral transmittance characteristics shown in FIG. 14.

If the number of layers is seven, it is necessary for the visible selective transmittance coating to include at least one middle refractive index layer in order to satisfy the condition of the spectral transmittance characteristics of the coating.

Next, with regard to the position of a valley hollow of a spectral transmittance curve, under the condition of a minimum transmittance located at a wavelength shorter than 400 nm, although the color rendering performance was less degraded, a quantity of lowering a color temperature by the coating was often smaller than 1000 K and not sufficient. Under the condition of a minimum transmittance located at a wavelength longer than 500 nm, a quantity of lowering a color temperature by the coating was very small or slightly increased with a considerably degraded color rendering performance and a reduced total luminous flux.

Figure 15:
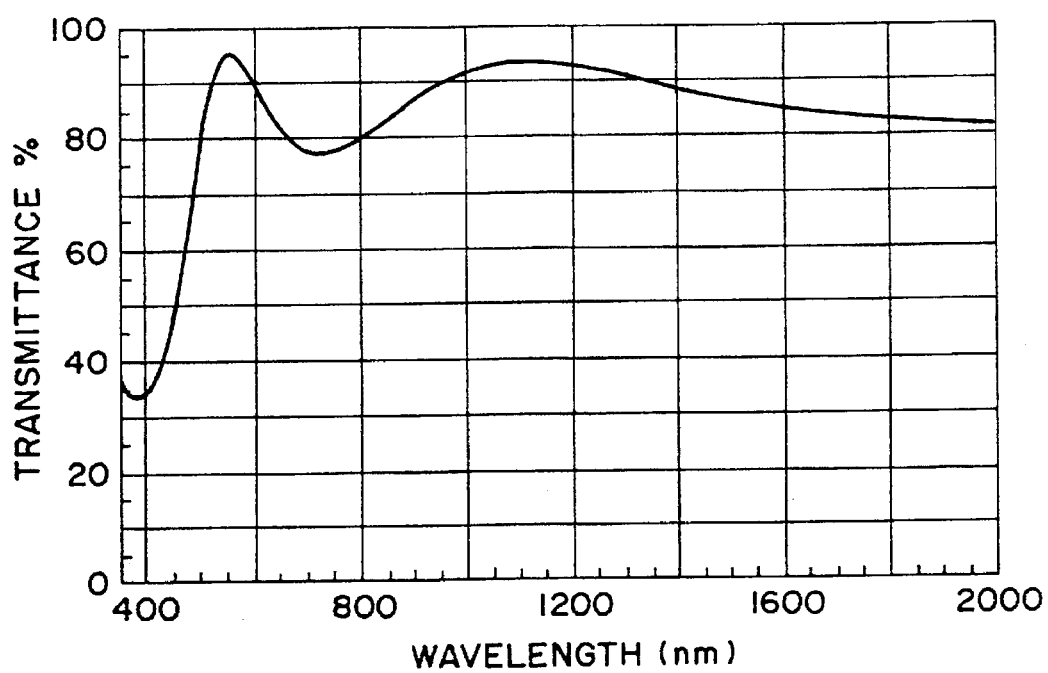
FIG. 15 is a graph showing the spectral transmittance characteristics of a visible selective transmittance coating applied to a metal halide lamp of a comparative example II.

For example, the six-layer coating having a layer constitution IX shown in Table 3 has a spectral transmittance characteristics shown in FIG. 15. A wavelength at a minimum transmittance was 370 nm. The lamp characteristics of a metal halide lamp using this six-layer coating (comparative example II) is shown in Table 4, and a quantity of lowering a color temperature by the coating was as very small as 170 K.

Figure 16:
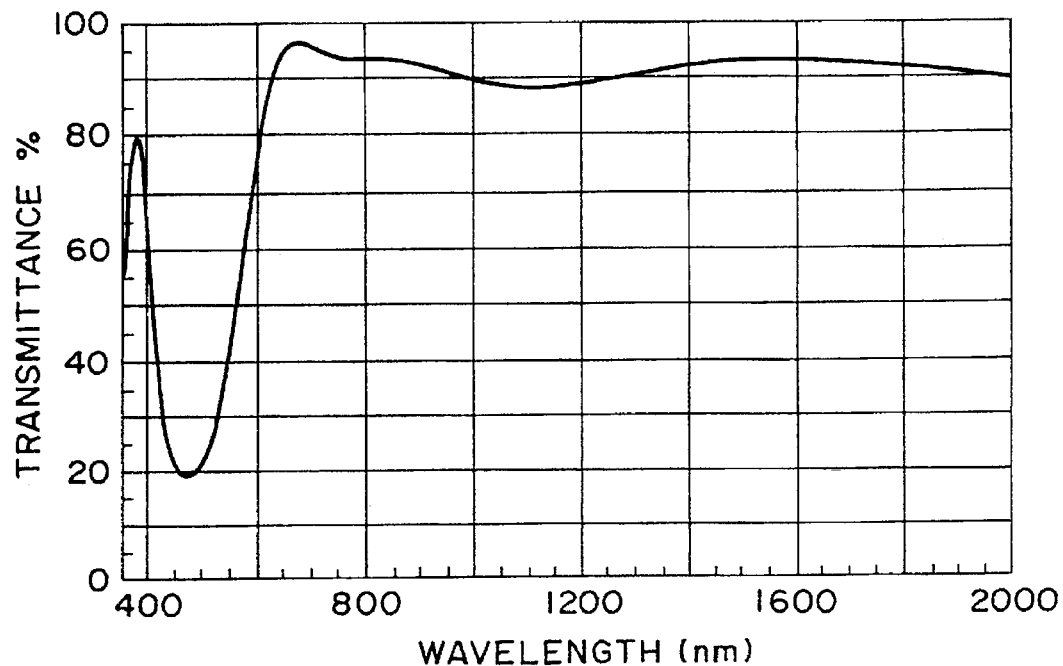
FIG. 16 is a graph showing the spectral transmittance characteristics of a visible selective transmittance coating applied to a metal halide lamp of a comparative example III.

With regard to a minimum spectral transmittance in the visible light range, under the condition of a minimum transmittance larger than 60 %, a quantity of lowering a color temperature by the coating was smaller than 1000 K and not sufficient. Under the condition of a minimum transmittance smaller than 30 % a quantity of lowering a color temperature was higher than 2500 K and unnecessarily large. For example, the seven-layer coating having a layer constitution XI shown in Table 3 has a spectral transmittance characteristics shown in FIG. 16.

The minimum spectral transmittance was 19% (at 470 nm).

The lamp characteristics of a metal halide lamp using this seven-layer coating (comparative example III) is shown in Table 4. A quantity of lowering a color temperature by the coating was very large so that the lamp color temperature was considerably lower than 3000 K. Ra was as small as 87.

Similar to the embodiments VI and VII, the metal halide lamps of the comparative examples I to III were lamps of a rated power of 150 W and the arc tubes were filled with $DyI_3$, TlI, CsI, mercury, and argon gas. When the lamps were burnt at a rated power in the coating-less state, the color temperature was 5000 to 5200 K, Ra was 94 to 95, and the total luminous flux was 11200 to 11400 lm. Also in the foregoing description of the comparative examples I to III, the lamp characteristics such as a color temperature were obtained when the lamps were burnt at a rated power. The layer materials of the visible selective transmittance coating used by the comparative examples I to III are $Ta_2O_5$ or $TiO_2$ as the high refractive layers and $SiO_2$ as the low refractive layers.

If the valley hollow of the spectral transmittance curve of the visible selective transmittance coating in the wavelength range of 350 to 550 nm cannot be considered as substantially one valley hollow but it is clearly divided into two valley hollows, the width of the valley hollow becomes broad in the wavelength direction and the range of visible light cut by the coating expands, so that the color rendering performance is degraded and the total luminous flux is reduced. A quantity of lowering a color temperature is also often insufficient. It is preferable that the valley hollow of a spectral transmittance curve has a V-character shape or a similar simple shape like a downward-convex parabola.

In the foregoing description, the embodiments and comparative examples are presented wherein the color temperature conversion effects are obtained in a desired range by regulating the spectral transmittance characteristics of a visible selective transmittance coating to a limited range. Apart from this, if a layer constitution (refractive index and thickness of each layer, and layer deposition order) of a visible selective transmittance coating is regulated, a certain limit can be added to the spectral transmittance characteristics of the coating.

In the following description, some embodiments and comparative examples are presented to explain differences of the effects between a layer constitution within a predetermined range and a layer constitution out of the predetermined range. The metal halide lamps of the embodiments and comparative examples to be described hereinafter have the lamp specifications such as a fill in an arc tube and a rated power same as the embodiments VI and VII and comparative examples I to III, excepting visible selective transmittance coatings. When these lamps were burnt at a rated power in the coating-less state, the color temperature was 5000 to 5200 K, Ra was 94 to 95, and the total luminous flux was 11200 to 11400 lm. Like the foregoing description, the lamp characteristics such as a color temperature were obtained when the lamps were burnt at a rated power. The layer materials of the visible selective transmittance coating are $Ta_2O_5$ or $TiO_2$ as the high refractive layers and $SiO_2$ as the low refractive layers. Also, a method of forming a visible selective transmittance coating on the outer surface of an arc tube is the same as the foregoing description.

Eighth and ninth embodiments of the invention will be described first.

Figure 12:
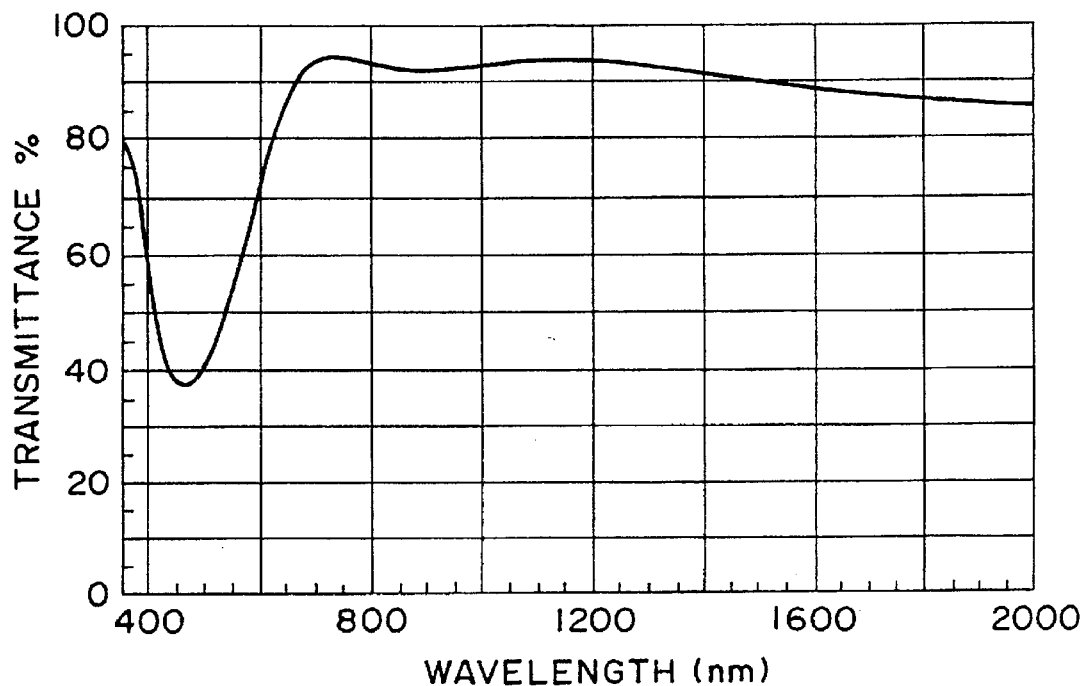
FIG. 12 is a graph showing the spectral transmittance characteristics of a visible selective transmittance coating applied to a metal halide lamp of an embodiment VIII.
Figure 13:
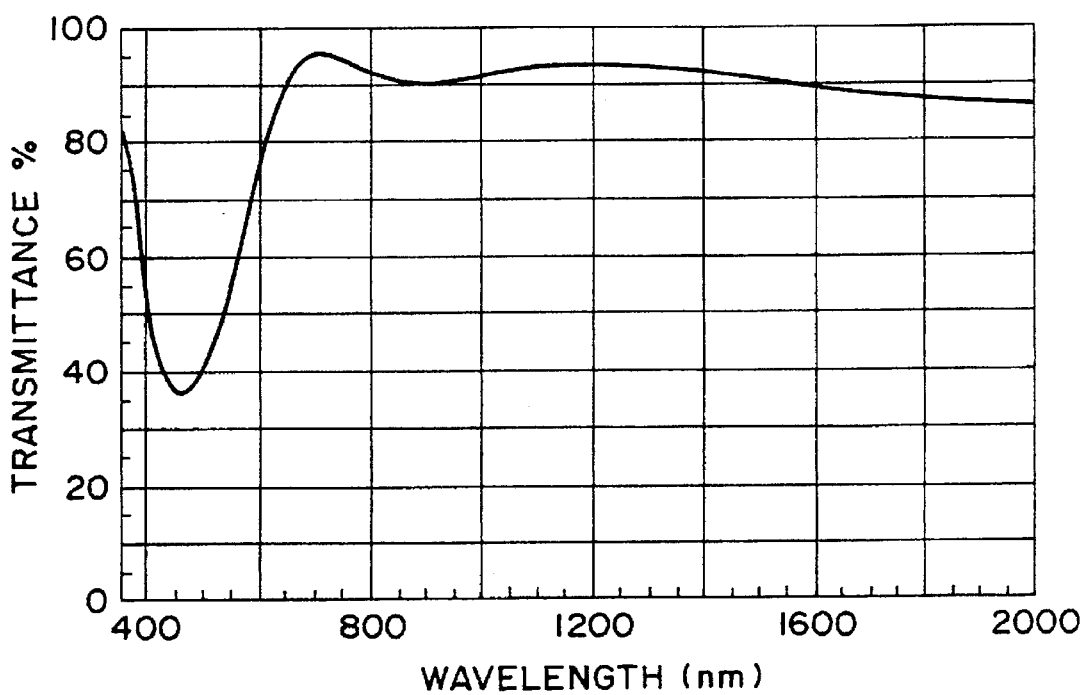
FIG. 13 is a graph showing the spectral transmittance characteristics of a visible selective transmittance coating applied to a metal halide lamp of an embodiment IX.

The visible selective transmittance coatings of the embodiments VIII and IX are a six-layer coating and a seven-layer coating, respectively, having layer constitutions VII and VIII shown in Table 3. The spectral transmittance characteristics of the coatings are shown in FIGS. 12 and 13. The lamp characteristics of the embodiments VIII and IX are shown in Table 4. A color temperature in the range of 3000 to 4000 K was obtained, a good color rendering performance was obtained, and the total luminous flux reduced scarcely.

A color temperature can be lowered by any visible selective transmittance coating without fail in the range of 1000 to 2500 K while fully satisfying the conditions of the spectral characteristics of the coating of the invention, so long as the coating satisfies the following layer constitution conditions. If the layer constitution conditions are satisfied, any visible selective transmittance coating provides the same effects as the two embodiments VIII and IX. The layer constitution conditions are the condition that a visible selective transmittance coating has 3 to 7 layers and the condition that a layer constitution is $S/H_1/L_1/(H_2/L_2)^n/H_3$, $S/H_1/L_1/(H_2/L_2)^n/H_3/L_3$, $S/M/H_1/L_1/(H_2/L_2)^n/HS$, or $S/M/H_1/L_1(H_2/L_2)^n/H_3/L_3$, $H_2$ is 115 to 140 nm, and $L_2$ is 115 to 140 nm.

In the layer constitution, $H_1$, $H_2$, and $H_3$ represent a high refractive index layer and its optical thickness, $L_1$, $L_2$, and $L_3$ represent a low refractive index layer and its optical thickness, M represents a middle refractive index layer and its optical thickness, and S represents a substrate, wherein $2H_1=H_2=2H_3$, $L_1=L_2=2L_3$, $2M=L_1$, n=0, 1, or 2, if the number of layers is 7, at least one middle refractive index layer is included, and only $H_2$ and $H_3$ maybe replaced by the middle refractive index layer. A Dy—Tl based metal halide lamp having a color temperature of 3000 to 4000 K can therefore be obtained. As above, the same results will be obtained even if the conditions of the spectral transmittance characteristics to be satisfied by a visible selective transmittance coating of the invention are replaced by the layer constitution conditions.

A fundamental layer constitution of a visible selective transmittance coating whose number of layers is odd, is $S/H_1/L_1/(H_2/L_2)^n/H_3$ one example of which is the coating of the embodiment VI. A fundamental layer constitution of a visible selective transmittance coating whose number of layers is even, is $S/H_1/L_1/(H_2/L_2)^n/H_3/L_3$ one example of which is the coating of the embodiment VIII.

These fundamental layer constitutions maybe modified to include a middle refractive index layer. However, if the number of layers is 7, at least one middle refractive layer is to be included. In this case, an optimum layer constitution is $S/M/H_1/L_1/(H_2/L_2)^n/H_3/L_3$ one example of which is the coating of the embodiment IX.

If the layer constitution of a visible selective transmittance coating does not satisfy the above-described conditions, not only a color temperature of a Dy—Tl based metal halide lamp was unable to be set to 3000 to 4000 K, but also in some cases the color rendering performance was degraded and the total luminous flux was reduced. This phenomenon will be explained below.

One example of a visible selective transmittance coating whose number of layers does not satisfy the conditions is the comparative example I. The effects of this coating is deficient as described previously. The coating of the comparative example belongs to the type of $S/H_1/L_1/(H_2/L_2)^n/H_3/L_3$ and the condition of the layer deposition order is satisfied. However, the number of layers is outside of the range of 3 to 7.

One example of a visible selective transmittance coating whose number of layers is 7 and which does not include a middle refractive index layer is the comparative example III the effects of which are deficient as described previously.

Next, examples of a visible selective transmittance coating whose optical thickness does not satisfy the above-described conditions will be described together with its resultant effects. Table 4 shows the lamp characteristics of the metal halide lamp (comparative example IV) using the six-layer coating with a layer constitution X shown in Table 3. Not only the color temperature increased by 620 K as compared to the coating-less state, but also the color rendering performance degraded considerably and the total luminous flux reduced greatly.

Figure 17:
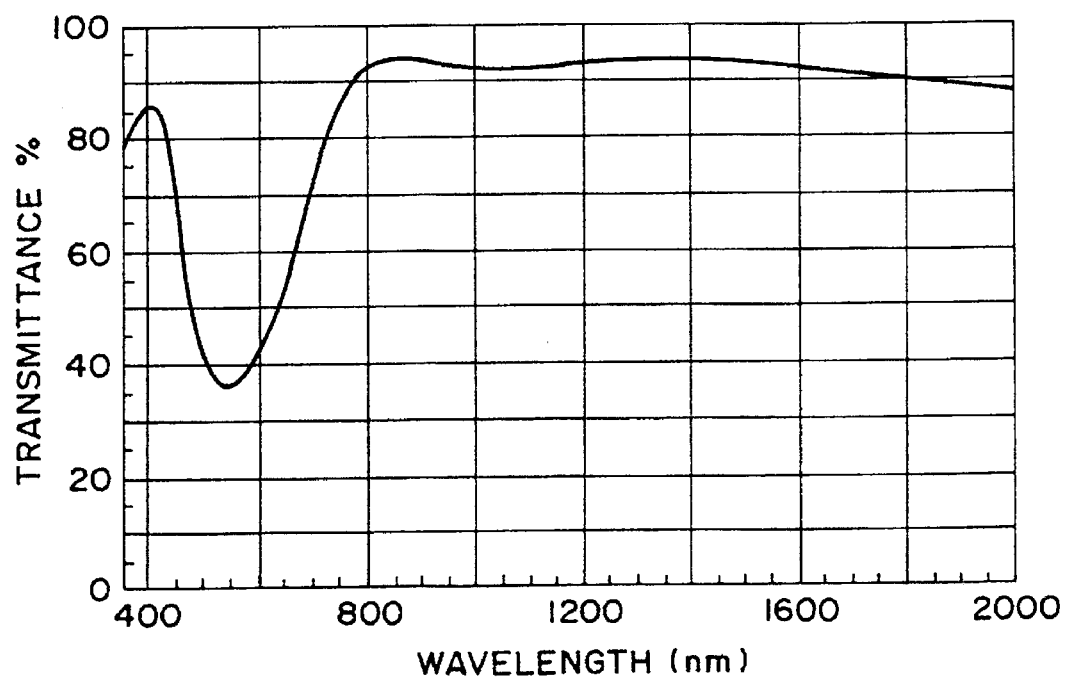
FIG. 17 is a graph showing the spectral transmittance characteristics of a visible selective transmittance coating applied to a metal halide lamp of a comparative example IV.

FIG. 17 shows the spectral transmittance characteristics of this six-layer coating. The deficiency of the six-layer coating maybe 10 considered resulting from that the six-layer coating cuts visual light greatly in the range around the wavelength of 500 to 550 nm as seen from FIG. 17. It is desired not to cut visual light of a wavelength of 500 nm or longer as much as possible. To this end, as indicated by the conditions, it is necessary to set each optical thickness to $H_2$=115 to 140 nm and $L_2$=115 to 140 nm where $2H_1=H_2=$ $2H_3$, $L_1=L_2=2L_3$, and $2M=L_1$ and to set the position of the valley hollow of the spectral transmittance curve in the wavelength range of 400 to 500 nm. As the material of the middle refractive index layer, it is desired to use material which has a refractive index of 1.60 to 1.65 and is resistant to a high temperature of 700° to 800° C. or higher, for example, aluminum oxide ($Al_2O_3$).

In the embodiments VI to VI and VI to IX described above, a visible selective transmittance coating is formed on the outer surface of an arc tube of a metal halide lamp. The invention is not limited to this, but it is obvious that the visible selective transmittance coating may be formed on other surfaces, such as the outer surface of an outer envelope of a lamp and on the outer surface of a light transmissive member enclosing an arc tube as in the case of the embodiment V.

In the foregoing description, a combination of $DyI_3$—$NdI_3$—$CsI$ is used for metal halide to be filled in an arc tube so as to set a color temperature of light in the arc tube, to 6500 to 7500 K when it is burnt, and a combination of $DyI_3$—$TlI$—$CsI$ is used for metal halide to be filled in an arc tube so as to set a color temperature to 4500 to 6000 K. The invention is not limited to these metal halide combinations, but other combinations may be used so long as they provide stable lamp characteristics and a desired color temperature. For example, a combination of $DyI_3$—$NdI_3$—$GaI_3$ is preferable for a color temperature of 6000 to 7500 K, and a combination of $DyI_3$—$TlI$—$In_3$ is preferable for a color temperature of 4500 to 6000 K.

Also in the foregoing description, the material of the high refractive index layer constituting a visible selective transmittance coating is all $Ta_2O_5$ or $TiO_2$. The invention is not limited thereto, but zirconium oxide ($ZrO_2$) or niobium oxide ($Nb_2O_5$) may also be used. A desired layer material combination maybe selected from $Ta_2O_5$—$SiO_2$, $TiO_2$—$SiO_2$, $ZrO_2$—$SiO_2$, and $Nb_2O_5$—$SiO_2$. If a layer constitution including a middle refractive index layer is used, a desired layer material combination may be selected from $Ta_2O_5$—$SiO_2$—$Al_2O_3$, $TiO_2$—$SiO_2$—$Al_2O_3$, $ZrO_2$—$SiO_2$—$Al_2O_3$, and $Nb_2O_5$—$SiO_2$—$Al_2O_3$.

The constitution requirements (kind, size, and shape of constituent elements, lamp rated power, presence/absence of a thermal insulating coating, and the like) of a metal halide lamp of this invention are obviously not limited only to the above embodiments.

In the first metal halide lamp of this invention, a visible selective transmittance coating having the above-described predetermined spectral transmittance characteristics is applied to a metal halide lamp having a color temperature of 4500 to 7500 K of light in the arc tube when it is burnt. Accordingly, a quantity of lowering a color temperature can be easily realized at any temperature in the range of 500 to 4000 K without the lamp luminous efficacy and color rendering performance from being degraded by the coating, and a metal halide lamp having a color temperature in the range of 2000 to 6000 K can be advantageously provided.

In the second metal halide lamp of this invention, a visible selective transmittance coating having the above-described predetermined spectral transmittance characteristics is applied to a metal halide lamp having a color temperature of 6000 to 7500 K of light in the arc tube when it is burnt and having metal halide of $DyI_3$—$NdI_3$—$CsI$ in the arc tube. Accordingly, a metal halide lamp having a color temperature in the wide range of 2000 to 6000 K and a high color rendering performance can be advantageously provided. Excellent effects in particular are that a metal halide lamp having a low color temperature range of 2000 to 3000 K with a high color rendering performance can be provided which has otherwise cannot be provided conventionally. Other excellent effects are that a metal halide lamp having a color temperature in the range of 2000 to 6000 K can be provided if only one type of an arc tube is prepared and the layer constitution is changed.

In the third metal halide lamp of this invention, a layer material of a visible selective transmittance coating is limited in the manner described earlier. Accordingly, the effects reside in that a visible selective transmittance coating is excellent in heat resistance and maintains the initial characteristics for the long period of time.

In the fourth metal halide lamp of this invention, a visible selective transmittance coating having the above-described predetermined spectral transmittance characteristics is applied to a metal halide lamp having a color temperature of 4500 to 6000 K of light in the arc tube when it is burnt and having metal halide of $DyI_3$—$TlI$—$CsI$ in the arc tube. Accordingly, a metal halide lamp having a color temperature in the range of 3000 to 4000 K in recent high commercial demands and a high color rendering performance can be advantageously provided.

What is claimed is:

1. A metal halide lamp comprising an arc tube filled with metal halide, mercury and inert gas, electrodes at the opposite ends of said arc tube and a glass housing of housing said arc tube, wherein a selective transmission coating which transmits irradiation light of longer wavelengths generated between said electrodes and reflects the irradiation light of shorter wavelengths is applied to the outer surface of said arc tube, wherein said selective transmittance coating is made of metal oxide and a multilayer optical interference coating having two or more layers, and has the spectral transmittance characteristics that the transmittance curve of said selective transmittance coating has one valley hollow like a downward-convex parabola shape having a minimum light transmittance of higher than 15% but lower than 40 % in the wavelength range of 400 to 500 nm, and that said selective transmittance coating has a light transmittance of 90 % or higher in the wavelength range of 700 to 900 nm, and that said selective transmittance coating has a light transmittance of a positive gradient slope in the wavelength range of 500 to 700 nm so that a color temperature of light radiated to the outside of the lamp is in the range of 3000 to 4000 K.

2. A metal halide lamp according to claim 1, wherein said selective transmission coating is a multi-layer interference film of metal oxide.

3. A metal halide lamp according to claim 1, wherein said oxide is deposited by a low pressure CVD process, ion-sputtering or dip-coating process.

4. A metal halide lamp according to claim 1, wherein said metal halide comprises dysprosium iodide, neodymium iodide and cesium iodide and the color temperature of the irradiation light inside the arc tube is 6000–7500 K.

5. A metal halide lamp according to claim 1, wherein said metal halide comprises iodides of dysprosium, thallium and cesium and the color temperature of the irradiation light inside the arc tube is 4500–6000 K.

6. A metal halide lamp according to claim 1, wherein the difference in color temperature between the irradiation lights inside and outside the arc tube is larger than 3000 K.

7. A metal halide lamp comprising:

an arc tube filled with metal halide, mercury, and inert gas, said arc tube having a color temperature of 4500 to 7500 K of light therein when said arc tube is burnt, and a thermal insulating coating made of fine grains such as metal oxide being coated on outer opposite end surfaces of said arc tube at the area enclosing electrodes;

an outer envelope enclosing said arc tube; and a visible selective transmittance coating formed on the outer surface of said arc tube not coated with said thermal insulating coating or on one of the inner and outer surfaces of a light transmissive member enclosing said arc tube, wherein said visible selective transmittance coating is made of metal oxide and a multilayer optical interference coating having two or more layers, and has the spectral transmittance characteristics that the transmittance curve of said visible selective transmittance coating has in the wavelength range of 350 to 650 nm substantially one valley hollow like a downward-convex parabola shape having a minimum light transmittance of 80 % or lower in the wavelength range of 350 to 500 nm, and that said visible selective transmittance coating has a light transmittance of 70 % or higher essentially including substantially 90 % or higher in the wavelength range of 600 to 900 nm, and substantially 85% or higher in the wavelength range of 900 to 2000 nm.

8. A metal halide lamp according to claim 7, wherein said metal halide includes at least dysprosium iodide, thallium iodide, and cesium iodide, a color temperature of light in said arc tube is 4500 to 6000 K when said arc tube is burnt, said visible selective transmittance coating is a multilayer interference coating having 3 to 7 layers and has the spectral transmittance characteristics that the transmittance curve of said visible selective transmittance coating has in the wavelength range of 350 to 550 nm substantially one valley hollow like a downward-convex parabola shape having a minimum light transmittance of 30 % or higher and 60 % or lower in the wavelength range of 400 to 500 nm, and that said visible selective transmittance coating has essentially a light transmittance of substantially 90 % or higher in the wavelength range of 600 to 700 nm, a color temperature of light radiated to the outside of the lamp is in the range of 3000 to 4000 K, and a general color rendering index (Ra) of the light is 92 or higher.

9. A metal halide lamp according to claim 8, wherein said visible selective transmittance coating is made of one or two layer material combinations selected from eight combinations including first combinations of $Ta_2O_5$—$SiO_2$, $TiO_2$—$SiO_2$, $ZrO_2$—$SiO_2$, and $Nb_2O_5$—$SiO_2$, and second combinations of the first combinations added with $Al_2O_3$.

10. A metal halide lamp according to claim 7, wherein said metal halide includes at least dysprosium iodide, neodymium iodide, and cesium iodide, a color temperature of light in said arc tube is 6000 to 7500 K when said arc tube is burnt, said visible selective transmittance coating has the spectral transmittance characteristics that said visible selective transmittance coating has a light transmittance of 70 % or higher in the wavelength range of 600 to 700 nm, and substantially 90 % or higher in the wavelength of 700 to 900 nm, a color temperature of light radiated to the outside of the lamp is in the range of 2000 to 6000 K, and a general color rendering index (Ra) of the light is 92 or higher.

11. A metal halide lamp according to claim 10, wherein said visible selective transmittance coating includes as its constituent at least one of a metal oxide combination selected from a group consisting of $Ta_2O_5$—$SiO_2$, $TiO_2$—$SiO_2$, $ZrO_2$—$SiO_2$, and $Nb_2O_5SiO_2$.

* * * * *